(12) United States Patent
Matsuda et al.

(10) Patent No.: US 11,834,999 B2
(45) Date of Patent: Dec. 5, 2023

(54) ELECTRIC POWER GENERATION CONTROLLER FOR USE IN AIRCRAFT

(71) Applicant: KAWASAKI JUKOGYO KABUSHIKI KAISHA, Kobe (JP)

(72) Inventors: Kippei Matsuda, Kobe (JP); Hideyuki Imai, Kobe (JP); Kenichiro Tanaka, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 288 days.

(21) Appl. No.: 17/294,036

(22) PCT Filed: Nov. 19, 2018

(86) PCT No.: PCT/JP2018/042641
§ 371 (c)(1),
(2) Date: May 14, 2021

(87) PCT Pub. No.: WO2020/105082
PCT Pub. Date: May 28, 2020

(65) Prior Publication Data
US 2022/0003170 A1   Jan. 6, 2022

(51) Int. Cl.
*F02C 7/32* (2006.01)
*F02C 7/36* (2006.01)
*B64D 41/00* (2006.01)

(52) U.S. Cl.
CPC ............... *F02C 7/32* (2013.01); *F02C 7/36* (2013.01); *B64D 2041/002* (2013.01);
(Continued)

(58) Field of Classification Search
CPC .................................. F02C 7/32; F02C 7/36
See application file for complete search history.

(56) References Cited

U.S. PATENT DOCUMENTS

| | | | |
|---|---|---|---|
| 4,817,460 A | * | 4/1989 | Reed .............. B62D 11/10 475/26 |
| 5,309,778 A | * | 5/1994 | Antonov ............. B60K 6/26 74/15.86 |

(Continued)

FOREIGN PATENT DOCUMENTS

| | | |
|---|---|---|
| EP | 2 228 566 A1 | 9/2010 |
| JP | 2001-158400 A | 6/2001 |

*Primary Examiner* — Shafiq Mian
(74) *Attorney, Agent, or Firm* — Sughrue Mion, PLLC

(57) ABSTRACT

An electric power generation controller for use in an aircraft is a controller of an electric power generating system configured such that: a manual transmission changes speed of rotational power of an aircraft engine; a continuously variable transmission changes the speed of the rotational power which has been changed in speed by the manual transmission; and the continuously variable transmission transmits the rotational power to an electric power generator. The electric power generation controller includes: a manual transmission control section configured to, when a predetermined shift condition is satisfied, control the manual transmission to switch a gear stage of the manual transmission; and a continuously variable transmission control section configured to, when the shift condition is satisfied, control the continuously variable transmission to such a side that fluctuation of an output rotational frequency of the manual transmission by the switching of the gear stage of the manual transmission is canceled.

2 Claims, 5 Drawing Sheets

(52) U.S. Cl.
CPC .... *F05D 2220/323* (2013.01); *F05D 2220/76* (2013.01); *F05D 2270/024* (2013.01)

(56) References Cited

U.S. PATENT DOCUMENTS

| | | | | |
|---|---|---|---|---|
| 8,169,100 | B2* | 5/2012 | Dooley | F02C 7/36 290/31 |
| 8,181,442 | B2* | 5/2012 | Youssef | F02C 7/36 60/268 |
| 2001/0003108 | A1* | 6/2001 | Goi | F16H 37/086 475/216 |
| 2010/0222971 | A1* | 9/2010 | Takahashi | F16H 61/702 701/51 |
| 2014/0309077 | A1* | 10/2014 | Heglund | F16H 1/28 475/311 |

* cited by examiner

ELECTRIC POWER GENERATION CONTROLLER FOR USE IN AIRCRAFT

CROSS REFERENCE TO RELATED APPLICATIONS

This application is a National Stage of International Application No. PCT/JP2018/042641 filed Nov. 19, 2018.

TECHNICAL FIELD

The present invention relates to a controller of an electric power generating system including a manual transmission which changes the speed of rotational power of an aircraft engine, transmits the rotational power to an electric power generator, and includes a plurality of gear stages.

BACKGROUND ART

Many of aircrafts include, as main power supplies, electric power generating apparatuses driven by flight engines. One example of such electric power generating apparatuses is a drive mechanism-integrated electric power generating apparatus (Integrated Drive Generator; IDG). This electric power generating apparatus integrally includes an electric power generator and a continuously variable transmission arranged upstream of the electric power generator (see PTL 1, for example).

CITATION LIST

Patent Literature

PTL 1: Japanese Laid-Open Patent Application Publication No. 2001-158400

SUMMARY OF INVENTION

Technical Problem

A case where large rotational frequency fluctuation of power taken out from an engine occurs is assumed, and it is necessary to consider a configuration capable of, even when a rotational frequency fluctuation range of the power becomes large, adjusting a rotational frequency of the power to an appropriate rotational frequency and transmitting the power to the electric power generator. As a countermeasure against this, if a speed change range of a continuously variable transmission of the electric power generating apparatus is made large, the continuously variable transmission needs to be increased in diameter, and the entire apparatus is increased in size, which is not preferable. As a countermeasure which deals with the large rotational frequency fluctuation while preventing the electric power generating apparatus from increasing in size, one idea is that: a small manual transmission (for example, two-stage manual transmission) is provided upstream of the electric power generating apparatus; and the rotational frequency fluctuation range of the power input to the electric power generating apparatus is narrowed by a speed change operation of the manual transmission.

However, according to the manual transmission, an output rotational frequency momentarily and suddenly decreases at the time of shift-up, and the output rotational frequency momentarily and suddenly increases at the time of shift-down. When the output rotational frequency of the manual transmission gently changes, a continuously variable transmission provided downstream of the manual transmission performs a speed change operation, and with this, the rotational frequency input to the electric power generator is adjusted to an appropriate range. However, when the output rotational frequency of the manual transmission momentarily and suddenly changes beyond a response ability of the continuously variable transmission, the rotational frequency of the power input to the electric power generating apparatus momentarily and largely fluctuates, and an electric power generation frequency becomes unstable.

An object of the present invention is to provide a controller of an electric power generating apparatus including a manual transmission provided upstream of an electric power generator, the controller being configured to prevent momentary rotational frequency fluctuation of power input to the electric power generator and stabilize electric power generation.

Solution to Problem

An electric power generation controller for use in an aircraft according to one aspect of the present invention is a controller of an electric power generating system configured such that: a manual transmission changes speed of rotational power of an aircraft engine; a continuously variable transmission changes the speed of the rotational power which has been changed in speed by the manual transmission; and the continuously variable transmission transmits the rotational power to an electric power generator. The electric power generation controller includes: a manual transmission control section configured to, when a predetermined shift condition is satisfied, control the manual transmission to switch a gear stage of the manual transmission; and a continuously variable transmission control section configured to, when the predetermined shift condition is satisfied, control the continuously variable transmission to such a side that fluctuation of an output rotational frequency of the manual transmission by the switching of the gear stage of the manual transmission is canceled.

According to the above configuration, even when the output rotational frequency of the manual transmission momentarily fluctuates at the time of the switching of the gear stage of the manual transmission, the continuously variable transmission is controlled to such a side that the fluctuation of the output rotational frequency of the manual transmission is canceled (for example, the target output rotational frequency is controlled to a fluctuation cancel side). Therefore, the fluctuation of the output rotational frequency of the continuously variable transmission is suppressed. On this account, in the electric power generating apparatus including the manual transmission provided upstream of the electric power generator, the momentary rotational frequency fluctuation of the power input to the electric power generator can be prevented, and the electric power generation can be stabilized.

The continuously variable transmission control section and the manual transmission control section may respectively control the continuously variable transmission and the manual transmission such that the gear stage of the manual transmission is switched after the continuously variable transmission is operated to such a side that the fluctuation of the output rotational frequency of the manual transmission is canceled.

According to the above configuration, at the time of the switching of the gear stage of the manual transmission, the continuously variable transmission can be controlled in advance to such a side that the fluctuation of the output rotational frequency of the manual transmission is canceled. Therefore, the momentary rotational frequency fluctuation can be suitably prevented.

When the manual transmission performs shift-down to decrease a change gear ratio, the continuously variable transmission control section may perform increase offset control of the continuously variable transmission to control an output rotational frequency of the continuously variable transmission to an increase side. When the manual transmission performs shift-up to increase the change gear ratio, the continuously variable transmission control section may perform decrease offset control of the continuously variable transmission to control the output rotational frequency of the continuously variable transmission to a decrease side.

According to the above configuration, when the manual transmission performs shift-up or shift-down, the momentary rotational frequency fluctuation of the power input to the electric power generator can be prevented, and the electric power generation can be stabilized.

An electric power generating apparatus for use in an aircraft according to another aspect of the present invention includes: the above-described electric power generation controller; a manual transmission configured to change speed of rotational power of an aircraft engine and including a plurality of gear stages; a continuously variable transmission configured to change the speed of the rotational power which has been changed in speed by the manual transmission; and an electric power generator to which the rotational power which has been changed in speed by the manual transmission is transmitted.

According to the above configuration, as described above, in the electric power generating apparatus including the manual transmission provided upstream of the electric power generator, the momentary rotational frequency fluctuation of the power input to the electric power generator can be prevented, and the electric power generation can be stabilized.

Advantageous Effects of Invention

According to the present invention, in the electric power generating system including the manual transmission provided upstream of the electric power generator, the frequent occurrence of the momentary rotational frequency fluctuation of the power input to the electric power generator can be prevented, and the electric power generation can be stabilized.

DESCRIPTION OF EMBODIMENTS

Hereinafter, an embodiment will be described with reference to the drawings.

Figure 1:
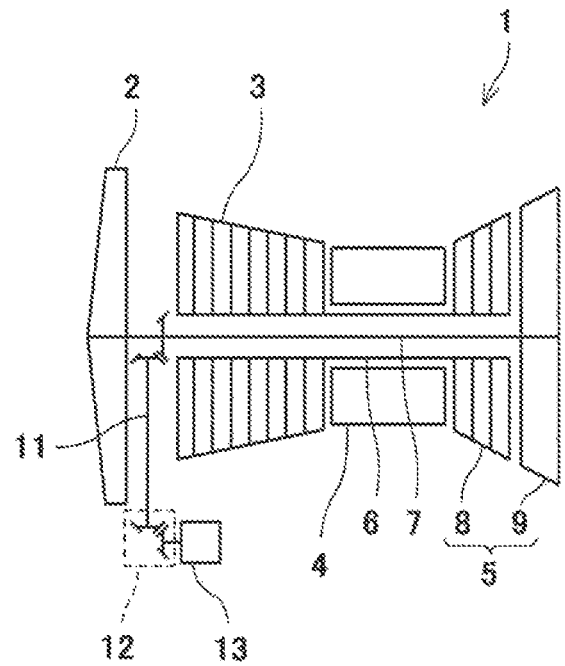
FIG. 1 is a schematic diagram showing an aircraft engine and an electric power generating system according to an embodiment.

FIG. 1 is a schematic diagram showing an aircraft engine 1 and an electric power generating apparatus 13 according to the embodiment. As shown in FIG. 1, the aircraft engine 1 is a two-shaft gas turbine engine and includes a fan 2, a compressor 3, a combustor 4, a turbine 5, a high-pressure shaft 6, and a low-pressure shaft 7. The fan 2 is arranged at a front portion of the aircraft engine 1 and is surrounded by a fan casing. The turbine 5 includes a high-pressure turbine 8 at a front stage side and a low-pressure turbine 9 at a rear stage side. The high-pressure turbine 8 is coupled to the compressor 3 through the high-pressure shaft 6. The high-pressure shaft 6 is a tubular shaft body including therein a hollow space. The low-pressure turbine 9 is coupled to the fan 2 through the low-pressure shaft 7. The low-pressure shaft 7 is inserted into the hollow space of the high-pressure shaft 6.

A connecting shaft 11 extending outward in a radial direction is connected to the low-pressure shaft 7 such that the low-pressure shaft 7 can transmit power to the connecting shaft 11. A gear box 12 is connected to the connecting shaft 11 such that the connecting shaft 11 can transmit the power to the gear box 12. The electric power generating apparatus 13 is connected to the gear box 12 such that the gear box 12 can transmit the power to the electric power generating apparatus 13. To be specific, rotational power of the low-pressure shaft 7 is transmitted through the connecting shaft 11 and the gear box 12 to the electric power generating apparatus 13. Since rotational frequency fluctuation of the low-pressure shaft 7 is larger than rotational frequency fluctuation of the high-pressure shaft 6, a rotational frequency fluctuation range of the power input to the electric power generating apparatus 13 becomes large. It should be noted that the power to be transmitted to the electric power generating apparatus 13 may be taken out from the high-pressure shaft 6 instead of the low-pressure shaft 7.

Figure 2:
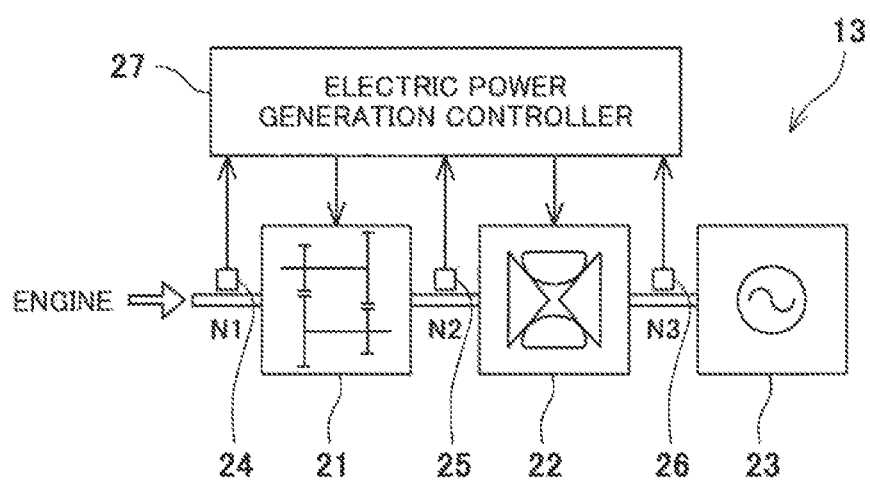
FIG. 2 is a block diagram showing the electric power generating system shown in FIG. 1.

FIG. 2 is a block diagram showing the electric power generating apparatus 13 shown in FIG. 1. As shown in FIG. 2, the electric power generating apparatus 13 includes a manual transmission 21, a continuously variable transmission 22, an electric power generator 23, and an electric power generation controller 27. The electric power generating apparatus 13 includes first to third rotational frequency sensors 24 to 26 as sensors. The rotational power taken out from the low-pressure shaft 7 of the aircraft engine 1 is changed in speed by the manual transmission 21 and the continuously variable transmission 22 and is then input to the electric power generator 23, and electric power generated by the electric power generator 23 is supplied to an electrical apparatus (not shown) of the aircraft. To be specific, a case where large rotational frequency fluctuation of the power taken out from the engine 1 occurs is assumed, and a rotational frequency of the power is adjusted by the manual transmission 21 and the continuously variable transmission 22 such that the rotational frequency of the power input to the electric power generator 23 stabilizes.

The rotational power taken out from the aircraft engine 1 is input to the manual transmission 21. The manual transmission 21 is a transmission configured to select a gear train, by which the power is transmitted, from a plurality of gear trains and perform speed change. When switching the gear train by which the power is transmitted, an output rotational frequency of the manual transmission 21 fluctuates. In the present embodiment, as one example, the manual transmission 21 is of a two-stage speed change type and includes a lower stage (equal speed stage) and an upper stage (speed increasing stage) having a larger change gear ratio (smaller reduction ratio) than the lower stage. When performing shift-up from the lower stage to the upper stage or performing shift-down from the upper stage to the lower stage, the manual transmission 21 changes from a state where one gear train is being selected to a state where another gear train is being selected through a disengaged state (neutral state). It should be noted that the present embodiment has described a case where the manual transmission 21 includes only two gear stages. However, the number of gear stages may be more than two.

The rotational power which has been changed in speed by and output from the manual transmission 21 is input to the continuously variable transmission 22. For example, a toroidal continuously variable transmission can be used as the continuously variable transmission 22. The toroidal continuously variable transmission changes the change gear ratio in such a manner that a power roller sandwiched by input and output discs is tilted by changing the position of the power roller by an actuator. Since the toroidal continuously variable transmission is publicly known, the explanation of a detailed structure thereof is omitted. It should be noted that the continuously variable transmission may be of a different type, and for example, may be a hydraulic transmission (Hydro Static Transmission).

The rotational power which has been changed in speed by and output from the continuously variable transmission 22 is input to the electric power generator 23. The electric power generator 23 is an AC generator. When the power having a constant rotational frequency is input to the electric power generator 23, the electric power generator 23 generates alternating current having a constant frequency.

The first rotational frequency sensor 24 detects an input rotational frequency N1 of the manual transmission 21. The second rotational frequency sensor 25 detects an output rotational frequency N2 of the manual transmission 21 (i.e., an input rotational frequency of the continuously variable transmission 22). The third rotational frequency sensor 26 detects an output rotational frequency N3 of the continuously variable transmission 22. The electric power generation controller 27 controls a speed change operation of the manual transmission 21 and a speed change operation of the continuously variable transmission 22 in accordance with the rotational frequencies N1, N2, and N3 detected by the first to third rotational frequency sensors 24 to 26. It should be noted that a gear may be interposed between the manual transmission 21 and the continuously variable transmission 22, and the output rotational frequency N2 of the manual transmission 21 does not have to coincide with the input rotational frequency of the continuously variable transmission 22.

Figure 3:
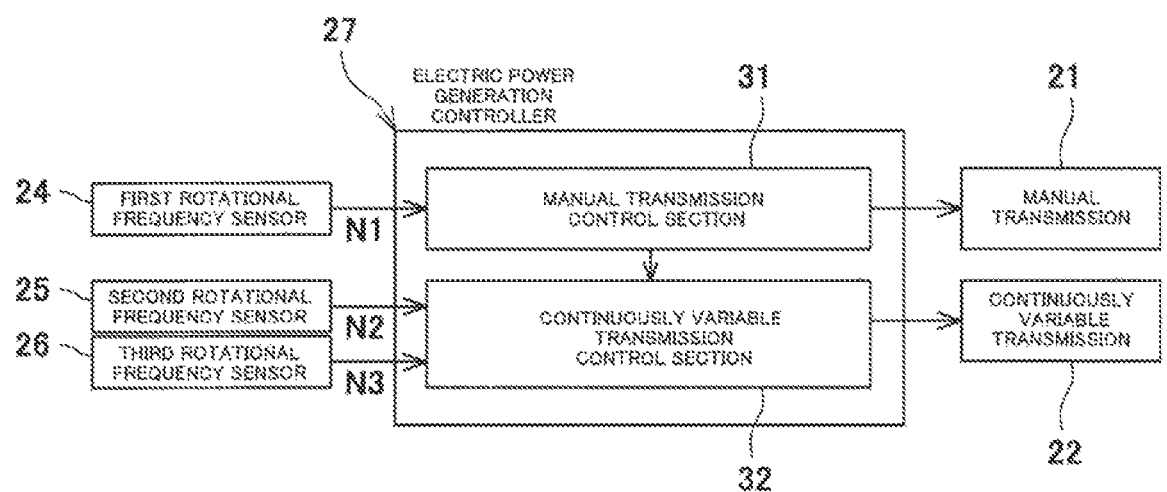
FIG. 3 is a block diagram showing an electric power generation controller shown in FIG. 2.

FIG. 3 is a block diagram showing the electric power generation controller 27 shown in FIG. 2. As shown in FIG. 3, the electric power generation controller 27 includes a processor, a volatile memory, a non-volatile memory, an I/O interface, and the like in terms of hardware. The electric power generation controller 27 includes a manual transmission control section 31 and a continuously variable transmission control section 32 in terms of software. Each of the manual transmission control section 31 and the continuously variable transmission control section 32 is realized in such a manner that the processor performs calculation processing by using the volatile memory based on a program stored in the non-volatile memory.

The manual transmission control section 31 receives the input rotational frequency N1 of the manual transmission 21 detected by the first rotational frequency sensor 24, as a monitoring rotational frequency used to control the manual transmission 21. It should be noted that the monitoring rotational frequency used to control the manual transmission 21 does not have to be the input rotational frequency of the manual transmission 21 and may be, for example, the output rotational frequency of the manual transmission 21. When a predetermined shift condition (a shift-up condition or a shift-down condition) is satisfied, the manual transmission control section 31 transmits a shift condition satisfied signal to the continuously variable transmission control section 32 and outputs to the manual transmission 21 a shift signal (a shift-up signal or a shift-down signal) which makes the manual transmission 21 switch the gear stage. The shift signal is output to the manual transmission 21 as a drive command of an actuator (not shown) used for the speed change operation of the manual transmission 21.

Specifically, when the monitoring rotational frequency N1 exceeds a first threshold A1 (see FIG. 5) (the shift-down condition is satisfied), the manual transmission control section 31 transmits a shift-down condition satisfied signal to the continuously variable transmission control section 32 and outputs the shift-down signal which makes the manual transmission 21 perform the shift-down (increase a reduction ratio) from the upper stage to the lower stage. Moreover, when the monitoring rotational frequency N1 falls below a second threshold A2 (see FIG. 5) (the shift-up condition is satisfied), the manual transmission control section 31 transmits a shift-up condition satisfied signal to the continuously variable transmission control section 32 and outputs the shift-up signal which makes the manual transmission 21 perform the shift-up (decrease the reduction ratio) from the lower stage to the upper stage. The first threshold A1 is set to, for example, a value larger than the second threshold A2.

The continuously variable transmission control section 32 continuously controls the change gear ratio of the continuously variable transmission 22 based on the input rotational frequency N2 of the continuously variable transmission 22 detected by the second rotational frequency sensor 25 and the output rotational frequency of the continuously variable transmission 22 detected by the third rotational frequency sensor 26 such that the output rotational frequency of the continuously variable transmission 22 (i.e., the input rotational frequency of the electric power generator 23) becomes constant. To be specific, when the input rotational frequency N2 of the continuously variable transmission 22 increases, the continuously variable transmission control section 32 changes the change gear ratio of the continuously variable transmission 22 to a speed-decrease side. Moreover, when the input rotational frequency N2 of the continuously variable transmission 22 decreases, the continuously variable transmission control section 32 changes the change gear ratio of the continuously variable transmission 22 to a speed-increase side.

Figure 4:
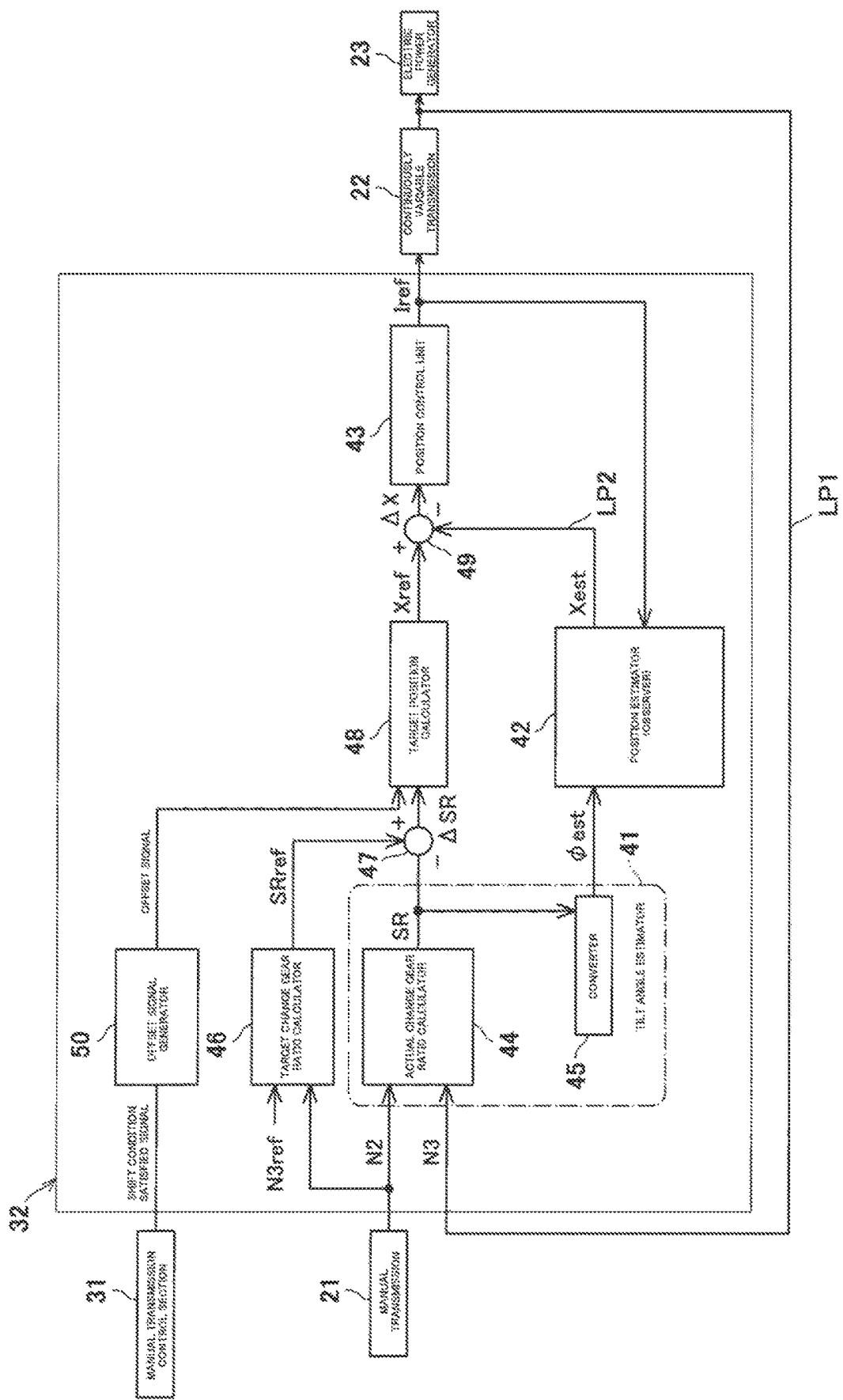
FIG. 4 is a block diagram showing a continuously variable transmission control section shown in FIG. 3.

FIG. 4 is a block diagram showing the continuously variable transmission control section 32 shown in FIG. 3. As shown in FIG. 4, the continuously variable transmission control section 32 includes a tilt angle estimator 41, a position estimator 42, and a position control unit 43. The tilt angle estimator 41 calculates an estimated value $\varphi_{est}$ that is a value obtained by estimating an actual value of a tilt angle of the power roller of the toroidal continuously variable transmission 22. The position estimator 42 calculates an estimated value $X_{est}$ that is a value obtained by estimating an actual value of the position of the power roller. The position estimator 42 is an observer created by using a model of the tilt angle φ and a model of the actuator and calculates the estimated value $X_{est}$ of the roller position based on the estimated value $\varphi_{est}$ of the tilt angle and an operating command value $I_{ref}$ of the actuator. The position control unit 43 calculates the operating command value $I_{ref}$ of the actuator configured to displace the position of the power roller, so as to eliminate a deviation ΔX between a target value $X_{ref}$ of the position of the power roller and the estimated value $X_{est}$.

The tilt angle estimator 41 obtains the estimated value $\varphi_{est}$ of the tilt angle by calculation without depending on a sensor configured to directly detect the tilt angle of the power roller. The tilt angle estimator 41 includes: an actual change gear ratio calculator 44 (actual change gear ratio acquirer) configured to calculate an actual change gear ratio SR; and a converter 45 configured to convert the actual change gear ratio SR into the estimated value $\varphi_{est}$ of the tilt angle. The actual change gear ratio calculator 44 calculates the actual change gear ratio SR based on a ratio between the input rotational frequency N2 of the continuously variable transmission 22 and the output rotational frequency N3 of the continuously variable transmission 22. The converter 45 calculates the estimated value $\varphi_{est}$ that is a value obtained by estimating the tilt angle in accordance with the actual change gear ratio SR by using an inverse function ($\varphi=f^{-1}(SR)$) of a function of the tilt angle φ to the actual change gear ratio SR.

The continuously variable transmission control section 32 includes a target change gear ratio calculator 46 configured to calculate a command value $SR_{ref}$ of the change gear ratio. The target change gear ratio calculator 46 calculates the command value $SR_{ref}$ of the change gear ratio in accordance with a ratio between the input rotational frequency N2 and a prestored command value $N2_{ref}$ of the output rotational frequency. In the present embodiment, the command value $N2_{ref}$ of the output rotational frequency is set to a constant value corresponding to a frequency suitable for the operation of electric components in the aircraft. For example, the command value $N2_{ref}$ is a constant value of 24,000 rpm when a target frequency $f_{ref}$ is 400 Hz, the number of poles of the electric power generator 23 is two, and the output rotational frequency is the rotational frequency of an input shaft of the electric power generator 23.

The continuously variable transmission control section 32 includes a change gear ratio subtracter 47 configured to calculate a deviation ΔSR between the command value $SR_{ref}$ of the change gear ratio and the actual change gear ratio SR (ΔSR=$SR_{ref}$−SR). The continuously variable transmission control section 32 includes a target position calculator 48 configured to calculate the target value $X_{ref}$ of the roller position so as to decrease the deviation ΔSR of the change gear ratio. To be specific, the target position calculator 48 calculates the target value $X_{ref}$ of the roller position by major closed loop control LP1 (first closed loop control; feedback control) such that the deviation ΔSR approaches zero.

The continuously variable transmission control section 32 includes a position subtracter 49 configured to calculate the deviation ΔX between the target value $X_{ref}$ of the position of the power roller and the estimated value $X_{est}$ (ΔX=$X_{ref}$−$X_{est}$). The position control unit 43 calculates the operating command value $I_{ref}$ of the actuator of the continuously variable transmission 22 so as to decrease the deviation ΔX. To be specific, the position control unit 43 calculates the operating command value $I_{ref}$ by minor closed loop control LP2 (second closed loop control; feedback control) such that the deviation ΔX approaches zero.

The continuously variable transmission control section 32 includes an offset signal generator 50 configured to output an offset signal in accordance with the shift condition satisfied signal (the shift-up condition satisfied signal or the shift-down condition satisfied signal) output from the manual transmission control section 31. When the offset signal generator 50 receives the shift condition satisfied signal from the manual transmission control section 31, the offset signal generator 50 outputs the offset signal which controls the continuously variable transmission 22 to such a side that the fluctuation of the output rotational frequency of the manual transmission 21 by the shift signal is canceled.

Specifically, when the offset signal generator 50 receives the shift-down condition satisfied signal from the manual transmission control section 31, the offset signal generator 50 outputs to the target position calculator 48 an increase offset signal which controls the output rotational frequency of the continuously variable transmission 22 to an increase side. When the target position calculator 48 receives the increase offset signal, the target position calculator 48 controls the target value $X_{ref}$ to the increase side by a predetermined amount. Moreover, when the offset signal generator 50 receives the shift-up condition satisfied signal from the manual transmission control section 31, the offset signal generator 50 outputs to the target position calculator 48 a decrease offset signal which controls the output rotational frequency of the continuously variable transmission 22 to a decrease side. When the target position calculator 48 receives the decrease offset signal, the target position calculator 48 controls the target value $X_{ref}$ to the decrease side by a predetermined amount.

It should be noted that a destination to which the offset signal of the offset signal generator 50 is input is not limited to the target position calculator 48 and may be another calculator as long as the output rotational frequency of the continuously variable transmission 22 can be controlled to such a side that the fluctuation of the output rotational frequency of the manual transmission 21 is canceled. For example, the offset signal may be input to the actual change gear ratio calculator 44, the target change gear ratio calculator 46, the position subtracter 49, or the like.

When the shift condition is satisfied, the manual transmission control section 31 outputs the shift condition satisfied signal to the continuously variable transmission control section 32 and then outputs the shift signal to the manual transmission 21. To be specific, a predetermined delay time is set between an output timing of the shift condition satisfied signal from the manual transmission control section 31 to the continuously variable transmission control section 32 (i.e., an output timing of the offset signal of the offset signal generator 50) and an output timing of the shift signal from the manual transmission control section 31 to the manual transmission 21. It should be noted that when the operation of the manual transmission 21 lags behind the operation of the continuously variable transmission 22, the offset signal does not necessarily have to be output before the shift signal. For example, the shift signal and the offset signal may be output at the same time.

Figure 5:
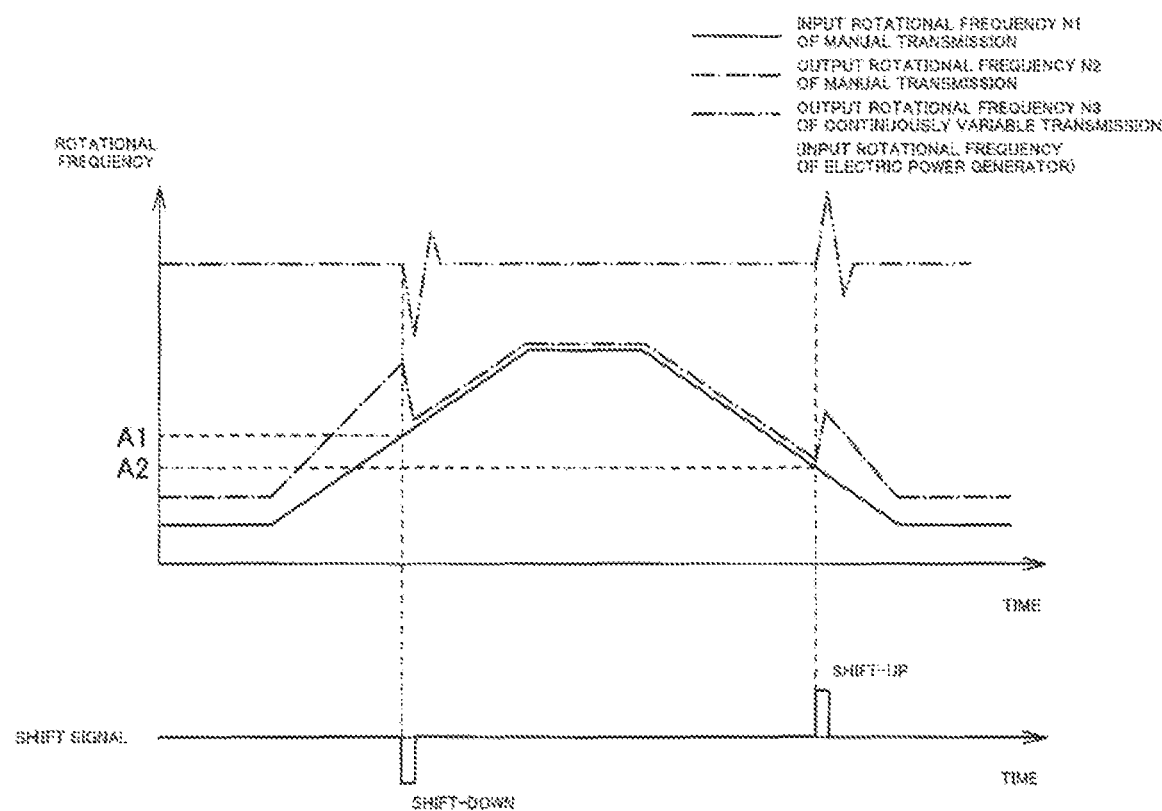
FIG. 5 is a graph showing a relationship among an input rotational frequency and an output rotational frequency of a manual transmission and an output rotational frequency of a continuously variable transmission in Comparative Example.
Figure 6:
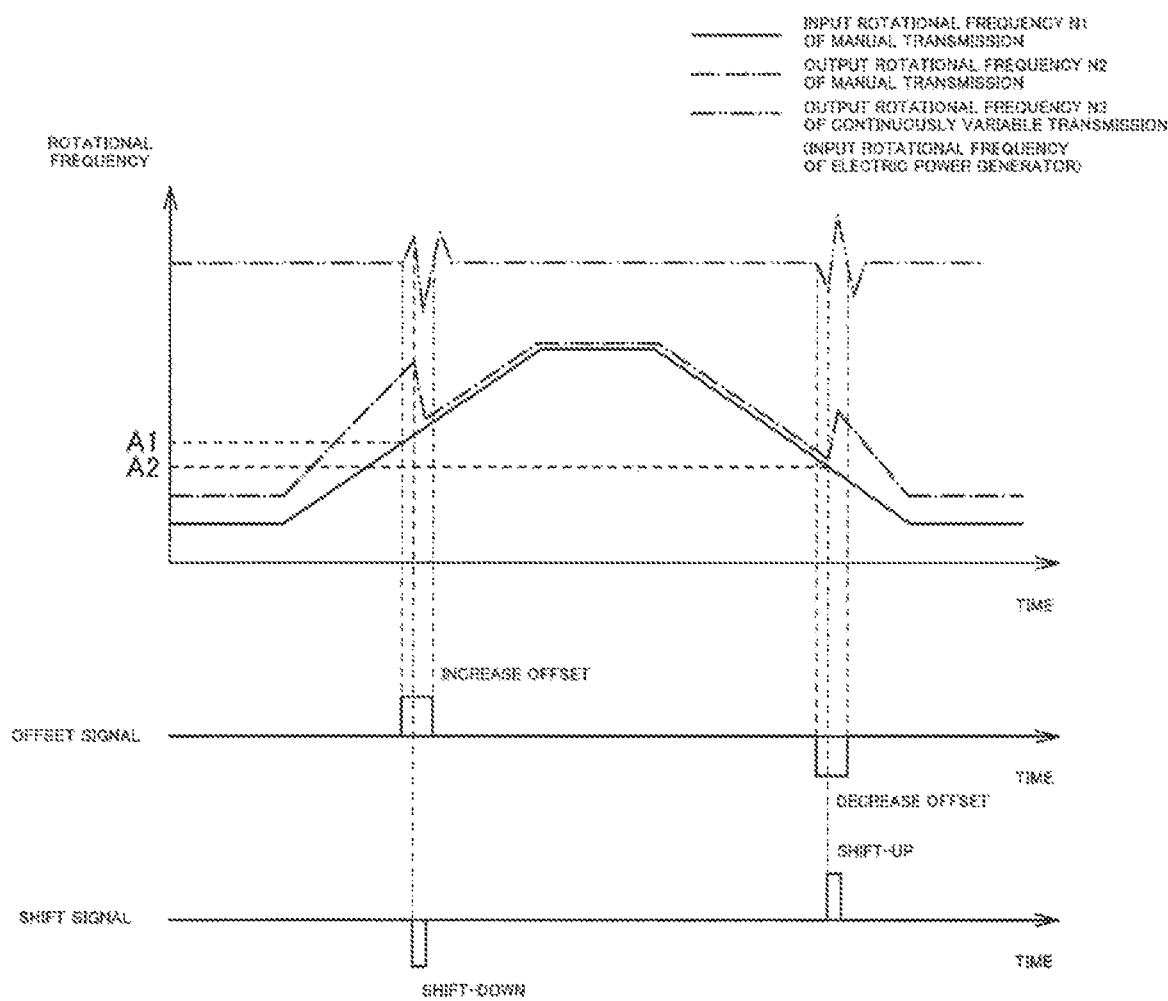
FIG. 6 is a graph showing a relationship among the input rotational frequency and the output rotational frequency of the manual transmission shown in FIG. 2 and the output rotational frequency of the continuously variable transmission shown in FIG. 2.

FIG. 5 is a graph showing a relationship among the input rotational frequency and the output rotational frequency of the manual transmission and the output rotational frequency of the continuously variable transmission in Comparative Example. FIG. 6 is a graph showing a relationship among the input rotational frequency and the output rotational frequency of the manual transmission 21 shown in FIG. 2 and the output rotational frequency of the continuously variable transmission shown in FIG. 2. It should be noted that each of FIGS. 5 and 6 shows an example of two-stage speed change in which the lower stage (low-speed stage) corresponds to equal speed, and the upper stage (high-speed stage) corresponds to speed increase. However, the present embodiment is not limited to this as long as the speed increasing ratio of the upper stage is larger than that of the lower stage (the reduction ratio of the upper stage is smaller than that of the lower stage).

Comparative Example shown in FIG. 5 is the same in configuration as the above-described embodiment except that the offset signal generator 50 is not provided in the continuously variable transmission control section. As shown in FIG. 5, in Comparative Example, when the shift-down condition in which the input rotational frequency of the manual transmission 21 exceeds the first threshold A1 is satisfied, the shift-down signal is output, and the manual transmission 21 is changed from the upper stage (high-speed stage) to the lower stage (low-speed stage). Therefore, the output rotational frequency of the manual transmission 21 suddenly changes to the decrease side, and the output rotational frequency of the continuously variable transmission 22 mainly and suddenly changes to the decrease side. Moreover, when the shift-up condition in which the input rotational frequency of the manual transmission 21 falls below the second threshold A2 is satisfied, the shift-up signal is output, and the manual transmission 21 is changed from a second stage (high-speed stage) to a first stage (low-speed stage). Therefore, the output rotational frequency of the manual transmission 21 suddenly changes to the increase side, and the output rotational frequency of the continuously variable transmission 22 mainly and suddenly changes to the increase side.

On the other hand, as shown in FIG. 6, in the example of the present embodiment in which the offset signal generator 50 is provided in the continuously variable transmission control section 32, when the shift-up condition in which the input rotational frequency of the manual transmission 21 exceeds the first threshold A1 is satisfied, the increase offset signal is first output, and the shift-down signal is then output after a predetermined delay time. Therefore, the amount of change of the output rotational frequency of the continuously variable transmission 22 to the decrease side is suppressed. Moreover, when the shift-up condition in which the input rotational frequency of the manual transmission 21 falls below the second threshold A2 is satisfied, the decrease offset signal is first output, and the shift-up signal is then output after a predetermined delay time. Therefore, the amount of change of the output rotational frequency of the continuously variable transmission 22 to the increase side is suppressed.

As above, even when the output rotational frequency of the manual transmission 21 momentarily fluctuates at the time of the output of the shift signal of the manual transmission 21, the continuously variable transmission 22 is controlled to such a side that the fluctuation of the output rotational frequency of the manual transmission 21 is canceled (for example, the target output rotational frequency is changed to a fluctuation cancel side). Therefore, the fluctuation of the output rotational frequency of the continuously variable transmission 22 is suppressed. On this account, in the electric power generating apparatus 13 including the manual transmission 21 provided upstream of the electric power generator 23, the momentary rotational frequency fluctuation of the power input to the electric power generator 23 can be prevented, and the electric power generation can be stabilized.

Moreover, when the shift condition is satisfied, the continuously variable transmission control section 32 outputs the offset signal, and then, the manual transmission control section 31 outputs the shift signal. Therefore, the continuously variable transmission 22 can be controlled in advance to such a side that the fluctuation of the output rotational frequency of the manual transmission 21 is canceled, and thus, the momentary rotational frequency fluctuation can be suitably prevented.

Moreover, the offset signal generator 50 stops outputting the offset signal after a shift operation (a shift-down operation or a shift-up operation) of the manual transmission 21 is completed. With this, after the speed change operation of the manual transmission 21 is completed, the output rotational frequency of the continuously variable transmission 22 (the input rotational frequency of the electric power generator 23) is controlled to a desired design value as with conventional cases. A timing at which the offset signal generator 50 stops outputting the offset signal can be set to, for example, a time point at which a predetermined timer time (fixed time) has elapsed since the start of the output of the offset signal.

It should be noted that the delay time may not be set between the output timing of the shift condition satisfied signal from the manual transmission control section 31 to the continuously variable transmission control section 32 (i.e., the output timing of the offset signal of the offset signal generator 50) and the output timing of the shift signal from the manual transmission control section 31 to the manual transmission 21, and these output timings may be the same as each other.

REFERENCE SIGNS LIST 1 aircraft engine
13 electric power generating apparatus
21 manual transmission
22 continuously variable transmission
23 electric power generator
27 electric power generation controller
31 manual transmission control section
32 continuously variable transmission control section

The invention claimed is:
1. An electric power generation controller for use in an aircraft,
the electric power generation controller being a controller of an electric power generating system configured such that: a manual transmission changes speed of rotational power of an aircraft engine; a continuously variable transmission changes the speed of the rotational power which has been changed in speed by the manual transmission; and the continuously variable transmission transmits the rotational power to an electric power generator,
the electric power generation controller comprising:
a manual transmission control section configured to, when a predetermined shift condition is satisfied, control the manual transmission to switch a gear stage of the manual transmission; and
a continuously variable transmission control section configured to, when the shift condition is satisfied, control the continuously variable transmission to such a side that fluctuation of an output rotational frequency of the manual transmission by the switching of the gear stage of the manual transmission is canceled, wherein when the manual transmission performs shift-down to decrease a change gear ratio, the continuously variable transmission control section performs increase offset control of the continuously variable transmission to control an output rotational frequency of the continuously variable transmission to an increase side; and when the manual transmission performs shift-up to increase the change gear ratio, the continuously variable transmission control section performs decrease offset control of the continuously variable transmission to control the output rotational frequency of the continuously variable transmission to a decrease side.

2. An electric power generating apparatus for use in an aircraft, the electric power generating apparatus comprising:

an electric power generation controller;

a manual transmission configured to change speed of rotational power of an aircraft engine and including a plurality of gear stages;

a continuously variable transmission configured to change the speed of the rotational power which has been changed in speed by the manual transmission; and an electric power generator to which the rotational power which has been changed in speed by the continuously variable transmission is transmitted, wherein the electric power generation controller includes:

a manual transmission control section configured to, when a predetermined shift condition is satisfied, control the manual transmission to switch a gear stage of the manual transmission; and a continuously variable transmission control section configured to, when the shift condition is satisfied, control the continuously variable transmission to such a side that fluctuation of an output rotational frequency of the manual transmission by the switching of the gear stage of the manual transmission is canceled, wherein the continuously variable transmission control section and the manual transmission control section respectively control the continuously variable transmission and the manual transmission such that the gear stage of the manual transmission is switched after the continuously variable transmission is operated to such a side that the fluctuation of the output rotational frequency of the manual transmission is canceled.

\* \* \* \* \*